(12) United States Patent
Kettle, Jr.

(10) Patent No.: US 6,626,506 B2
(45) Date of Patent: Sep. 30, 2003

(54) METHOD AND APPARATUS FOR CONTROLLING ELECTRO-PNEUMATIC BRAKING ON A TRAIN

(75) Inventor: Paul J. Kettle, Jr., Ijamsville, MD (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 35 days.

(21) Appl. No.: 09/840,589

(22) Filed: Apr. 23, 2001

(65) Prior Publication Data
US 2002/0153766 A1 Oct. 24, 2002

(51) Int. Cl.[7] ............................................... B60T 15/14
(52) U.S. Cl. ....................... 303/15; 303/3; 303/DIG. 1; 303/DIG. 3
(58) Field of Search ....................... 303/15, 3, DIG. 1, 303/DIG. 2, DIG. 3, 86

(56) References Cited

U.S. PATENT DOCUMENTS

| | | | | |
|---|---|---|---|---|
| 4,859,000 A | * | 8/1989 | Deno et al. ................... 303/33 |
| 4,904,027 A | * | 2/1990 | Skantar et al. ................ 303/15 |
| 5,064,251 A | * | 11/1991 | Romansky ..................... 303/3 |
| 5,192,118 A | * | 3/1993 | Balukin et al. ............... 303/15 |
| 5,332,297 A | * | 7/1994 | Cunkelman et al. .......... 303/15 |
| 5,415,465 A | | 5/1995 | Skantar et al. ................. 303/3 |
| 5,460,435 A | | 10/1995 | Chew .......................... 303/44 |
| 5,630,565 A | | 5/1997 | Lumbis .................. 246/182 B |
| 5,721,683 A | | 2/1998 | Joyce, Jr. et al. ............. 701/70 |
| 5,722,736 A | | 3/1998 | Cook ........................... 303/15 |
| 5,808,370 A | | 9/1998 | Bezos ........................ 307/9.1 |
| 5,975,651 A | | 11/1999 | Bezos ......................... 303/20 |
| 5,984,427 A | | 11/1999 | Kettle, Jr. .................... 303/16 |
| 6,375,275 B1 | * | 4/2002 | Smith, Jr. et al. ............... 303/3 |
| 6,435,623 B1 | * | 8/2002 | Peltz .......................... 303/15 |

* cited by examiner

Primary Examiner—Jack Lavinder
Assistant Examiner—Mariano Sy
(74) Attorney, Agent, or Firm—Buchanan Ingersoll, P.C.

(57) ABSTRACT

Method and apparatus for controlling braking on a train having ECP railcars using a conventional automatic brake valve. The locomotive and railcars are connected to brake pipe and a wireline, or use RF communications. A brake handle or other brake control valve interface is operated to cause a pressure change in an equalizing reservoir. The relay valve is isolated from the pressure change and connected to a reference pressure whereby brake pipe pressure is maintained. The pressure change is sensed and a signal generated representative thereof which is used to determine the level of braking commanded on the railcars. The apparatus includes an interface unit interposed between pertinent ports connecting the automatic brake valve, equalizing reservoir and brake pipe, and an equalizing reservoir pressure sensor to provide an output signal to an ECP controller for controlling braking on the railcars.

5 Claims, 7 Drawing Sheets

METHOD AND APPARATUS FOR CONTROLLING ELECTRO-PNEUMATIC BRAKING ON A TRAIN

BACKGROUND

The present invention relates generally controlling electro-pneumatic braking on railway train of railcars having electrically controlled pneumatic (ECP) brake equipment, and more particularly to a method and apparatus for controlling the braking on such ECP equipped railcars from an automatic brake control valve on a locomotive of the train, which automatic brake valve conventionally controls the train brakes pneumatically via a brake pipe interconnecting the locomotive and the railcars. An example of such an automatic brake valve is a Type 26 automatic brake valve manufactured by Westinghouse Air Brake Technologies Company ("WABTEC"™), or other types of locomotive brake control valves which operate in the same general manner. Controlling the application of brakes on ECP equipped railcars using a conventional automatic brake valve provides a manner of control which is similar in appearance and operation to existing pneumatic braking equipment from the train operator's standpoint, while incorporating the advantages of ECP braking, as discussed in detail hereinafter.

The existing standard method of controlling air brakes on trains using an automatic brake valve involves pressurizing a fluid passageway, and its associated connectors and fittings, known collectively as the brake pipe, to which the locomotive and each railcar is interconnected. In particular, such automatic brake valves can operate the train brakes by the train operator initiating pressure changes in an equalizing reservoir via the automatic brake handle, or other automatic brake valve operator interface. The pressure change in the equalizing reservoir, or a similar pressurized control volume, can be mirrored in the brake pipe by a relay valve, which is typically a portion of the automatic brake valve. The pressure change in the brake pipe is then detected by brake equipment on each railcar, which is connected to the brake pipe, and used to control the level of braking on the railcar. Conventionally, each railcar has equipment for applying the brakes, including an air reservoir which is typically divided into two portions—an emergency portion and an auxiliary portion, and a pneumatic brake control valve for applying and releasing the brakes on the railcar. One such railcar brake valve is, for example, an ABDW™ valve manufactured by WABTEC™. However, it should also be understood that there are other types of railcar brake control valves besides the ABDW™ which operate in the same general manner. The such railcar brake control valves can typically have a service portion—for service level brake applications, and an emergency portion—for emergency brake applications. The auxiliary and emergency reservoirs are normally charged from the brake pipe to a predetermined pressure, which is set by the train operator, using what is commonly referred to as the "feed valve." Once the brake pipe on a train has been charged to the feed valve setting, the brake equipment of the controlling locomotive, when so equipped, will maintain the desired pressure against slight to moderate leakage.

In order to apply the brakes on the train, the operator typically uses an interface, or control portion of the automatic brake valve, which is typically the brake handle, but could be any other type of operator control portion or device, to reduce the pressure in the brake pipe by a selected amount. A low to moderate reduction of pressure in the brake pipe will cause the service portion or the railcar brake control valve to admit air from the auxiliary reservoir into the brake cylinder, in proportion to the amount of reduction in brake pipe pressure, to apply the brakes on the railcar. Subsequent reductions in brake pipe pressure will cause greater brake cylinder pressure, up to the point at which the pressure in the auxiliary reservoir is permitted to equalize with the pressure in the brake cylinder. If a greater amount of brake cylinder pressure is desired, the brake pipe pressure can be rapidly reduced to zero, which will cause the railcar brake control valve emergency portion to add the volume of the emergency reservoir to the combined auxiliary reservoir and brake cylinder pressure.

Due to the design of freight car brake equipment, as well as the properties of compressed air in the brake system, an incremental, or "graduated" release of the brakes on a freight train is not possible. The operator can release the brakes on the each railcar only by moving the handle of the automatic brake valve to the "release" position, thereby restoring the pressure in the brake pipe to the previously established feed valve setting. In response to the rise in brake pipe pressure, the brake control valves on the each railcar will vent the brake cylinder to release the pressure, and also couple the auxiliary and emergency reservoirs to the brake pipe to restore the pressure in each reservoir to the desired setpoint.

It should be understood that the movement of pressurized air within the brake pipe is typically restrained by various factors, such as bends, branch pipes, rubber hoses, couplings, and the like. Therefore, upon initiation of a brake application by the train operator, via a reduction in brake pipe pressure, a lengthy delay may occur until the brakes at the rearmost railcars of the train begin to develop significant braking effort. As a result, an unequal application of the brakes occurs through the train, due to the amount of time it takes for the pressure reduction in the brake pipe to propagate through the brake pipe from the locomotive to the rearmost railcars in the train. A consequence of non-uniform braking on the railcars from front of the train to rear is that serious tensile or compressive forces can be generated in the train, which can cause serious train handling problems.

Similarly, when releasing the brakes following an application, air must flow into the brake pipe from the front of the train, and release of the brakes on each railcar occurs, like the brake application process described above, in a sequential manner, rather than simultaneously as would be preferred. Again, serious consequences may result from the thus generated in-train forces, especially at slow speeds.

In order to eliminate several of the perceived shortcomings of the conventional pneumatically implemented train braking control system, an ECP brake system has been developed by which each railcar can develop truly simultaneous brake applications and releases through the use of a cable, commonly called a trainline, connected between the various cars of the train. Alternatively to the use of a trainline, radio communication control could be utilized between the locomotives and the railcars. The trainline can provide two functions: 1) a source of current from which the electronic equipment on each car can charge local batteries, and 2) a pathway by which electrical control signals can be communicated to cars and other locomotives so equipped.

In the ECP braking system, trains made up of cars and locomotives so equipped can operate in such a fashion that the brake pipe no longer serves as both a supply and control line, but becomes only a means by which air is supplied to the cars for charging their reservoirs and supplying brake cylinder pressure. Applications of the brakes on the cars can instead be accomplished by means of an electrical signal on the trainline, or by radio communication. Each railcar, and additional locomotives when used, in the train can receive command signals and apply or release the brakes on the car according to the level of braking communicated in the command signal.

Since all of the brakes on the train will apply in parallel, rather than serially, smoother handling of the train can be achieved with less chance of damage to the train or its cargo. A second benefit of the ECP system is that the brake cylinder pressure on the various railcars can now be released in incremental steps. This graduated release allows the train operator to gradually reduce the braking effort on the train without danger of having the train pick up excessive speed from having to fully release the brakes on all of the railcars.

Presently known ECP system are filly electronic, using components such as magnet valves and transducers to develop the required level of air pressure in the brake cylinders. The existing brake equipment in conventional locomotives, i.e., non-electronic brake control valves, operates by controlling air pressure mechanically. Therefore, for conventional brake control equipment in locomotives to be able to control the brakes on ECP equipped railcars, an additional piece of equipment, called a Head End Unit (HEU), it typically added to permit the train operator to control braking on the railcars. However, the HEU competes with space in the already crowded locomotive cab. To control ECP braking on the railcars, such HEUs typically includes a variety of push-button controls, requiring the train operator to use this additional train brake control device to operate the brakes on the railcars in ECP mode. This is also in contrast to the movement of the brake handle typically used on conventional non-electronic locomotive automatic brake control valves to which the operator is accustomed.

Accordingly it would be desirable to provide a brake control system which permits a train operator to control the brakes on the railcars in an ECP manner using the existing pneumatic locomotive brake control valve. Moreover, the brake handle commonly used with such brake valves, with which the train operator may be comfortable, can also be used to control the ECP braking on the railcars, thus integrating the operation of the ECP braking system with the conventional pneumatic locomotive brake control valve such that an additional ECP brake control device is not required.

SUMMARY

In its most basic form, the invention provides a method and apparatus for controlling the braking on ECP equipped railcars using a conventional automatic brake valve by converting the pressure changes created by the automatic brake valve, which constitute the pneumatic brake command signals that are normally used to control train braking via the brake pipe, to signals which can be communicated via a brake control signaling system, such as a trainline or RF communication system, by which the locomotive and railcars are inter-connected. The converted signals are thus used to control ECP braking on the railcars via the brake control signaling system. In particular, the apparatus can include an interface unit for interrupting pertinent pneumatic connections between the automatic brake valve and the equalizing reservoir, such that a pressure change initiated via the automatic brake valve is not mirrored in the brake pipe, as typically occurs in response to a pressure change in the equalizing reservoir, to control braking on the railcars. Instead, the apparatus can include a pressure sensor for detecting such pressure change and converting the pneumatic signal to an output electrical signal. This output signal is then communicated to an ECP control device which uses the signal to control braking on the railcars in an ECP manner via the brake control signaling system. The interface unit can also connect the automatic brake valve to a regulating valve, the output of which is maintained at the feed valve setting, thus generally maintaining the brake pipe pressure at the feed valve setting such that the brake pipe is continuously charged. Moreover, the interface unit can used to both isolate the brake pipe from the automatic brake valve and connect the equalizing reservoir with the aforementioned pressure sensor. The ECP control device which controls braking on the railcars can simply be a device which receives the pressure sensor output signal and determines therefrom the desired level of braking to be commanded on the ECP equipped railcars. The ECP controller can operate autonomously, requiring no attention from the train operator. Consequently, the conventional automatic brake valve can be used to control the braking on ECP equipped railcars without the need for a separate, additional ECP brake control device in the cab of the locomotive to control ECP braking.

Similarly, a method of controlling braking on ECP equipped railcars can include the steps of: using a conventional automatic brake valve to create a pneumatic brake command signal; converting the pneumatic brake command signal to a signal which can be communicated via a brake control signaling system; and controlling braking on the railcars based upon the converted signal. Additional steps can include isolating the brake pipe from the pressure change and maintaining the brake pipe at a predetermined pressure. In more detail, the method can include isolating a pressure change in the equalizing reservoir from a relay valve portion of the automatic brake valve, such that the relay valve portion does not cause the brake pipe pressure to mirror the equalizing reservoir pressure according to the conventional functioning of the automatic brake valve; sensing the pressure change caused in the equalizing reservoir; communicating a signal representative of the pressure change in the equalizing reservoir to an ECP controller; and controlling braking on the ECP equipped railcars based upon such signal. In addition, a pressure gauge can be provided along with various pressure switches for permitting the brake system to perform certain specific brake functions while the interface unit is interposed in the system.

Other details, objects, and advantages of the invention will become apparent from the following detailed description and the accompanying drawings figures of certain embodiments thereof.

BRIEF DESCRIPTION OF THE DRAWING FIGURES

A more complete understanding of the invention can be obtained by considering the following detailed description in conjunction with the accompanying drawings, in which.

DETAILED DESCRIPTION OF CERTAIN EMBODIMENTS

Figure 1:
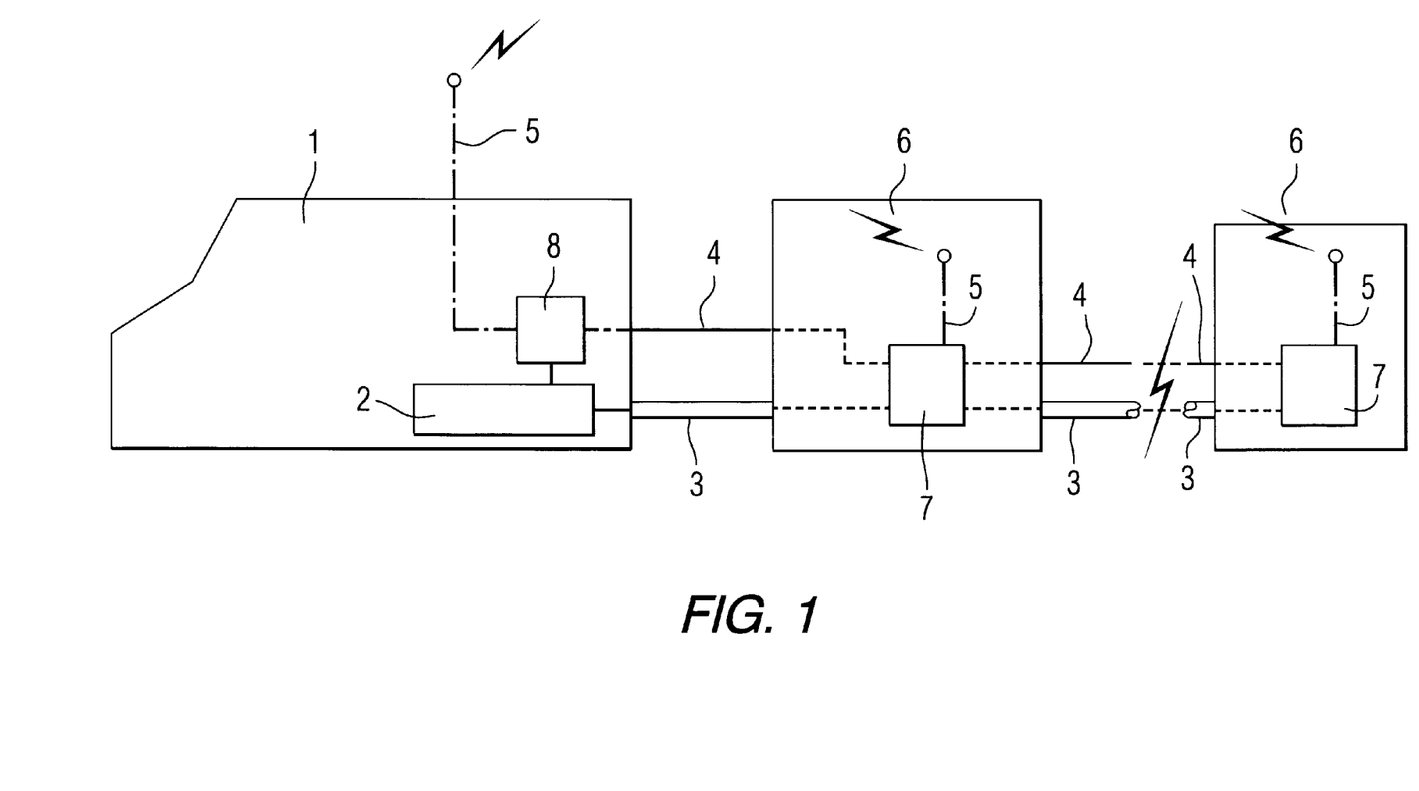
FIG. 1 illustrates the major components of a train braking system according to a presently preferred embodiment of the invention.
Figure 2A:
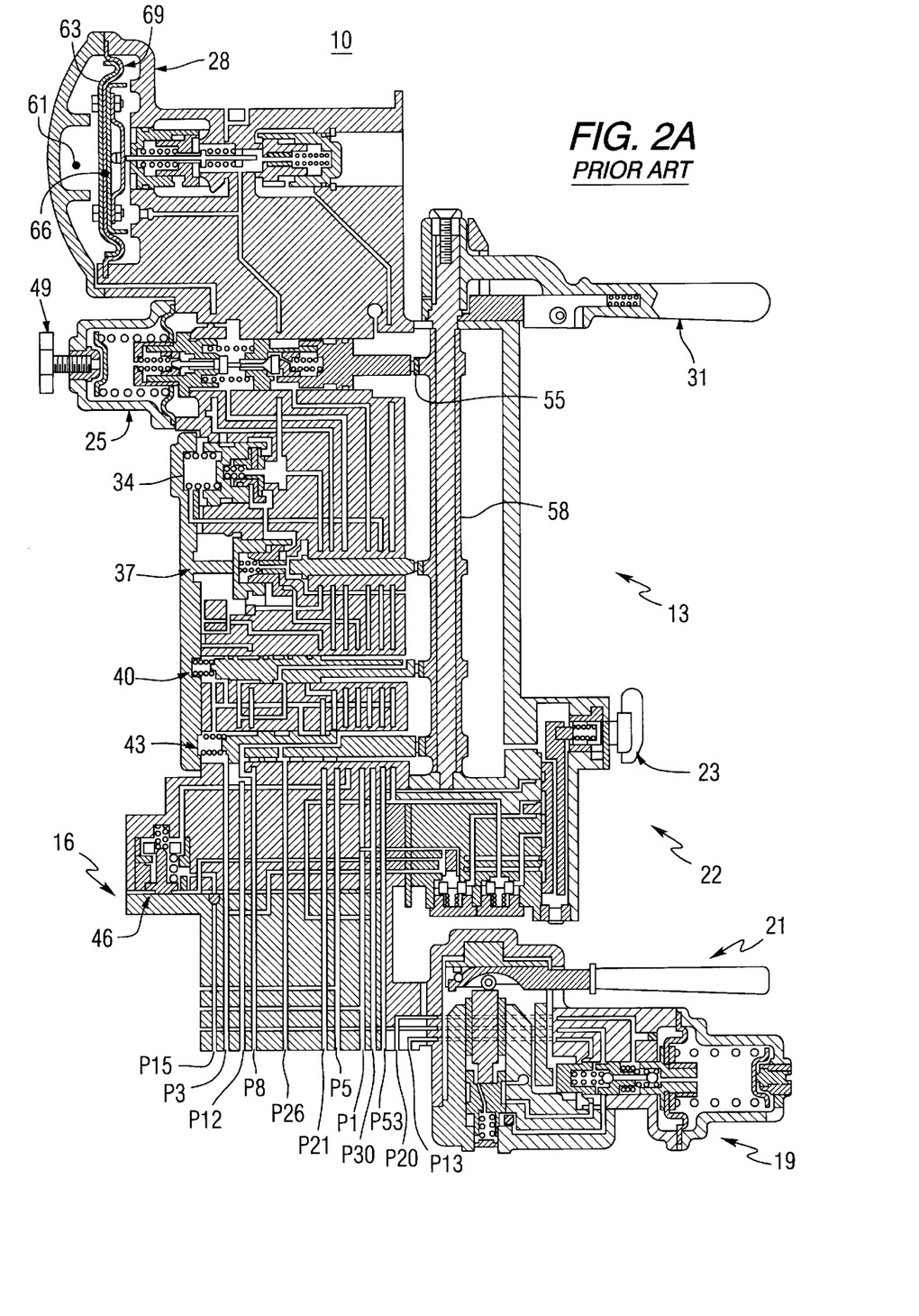
FIG. 2A illustrates a conventional pneumatic automatic brake valve.
Figure 2B:
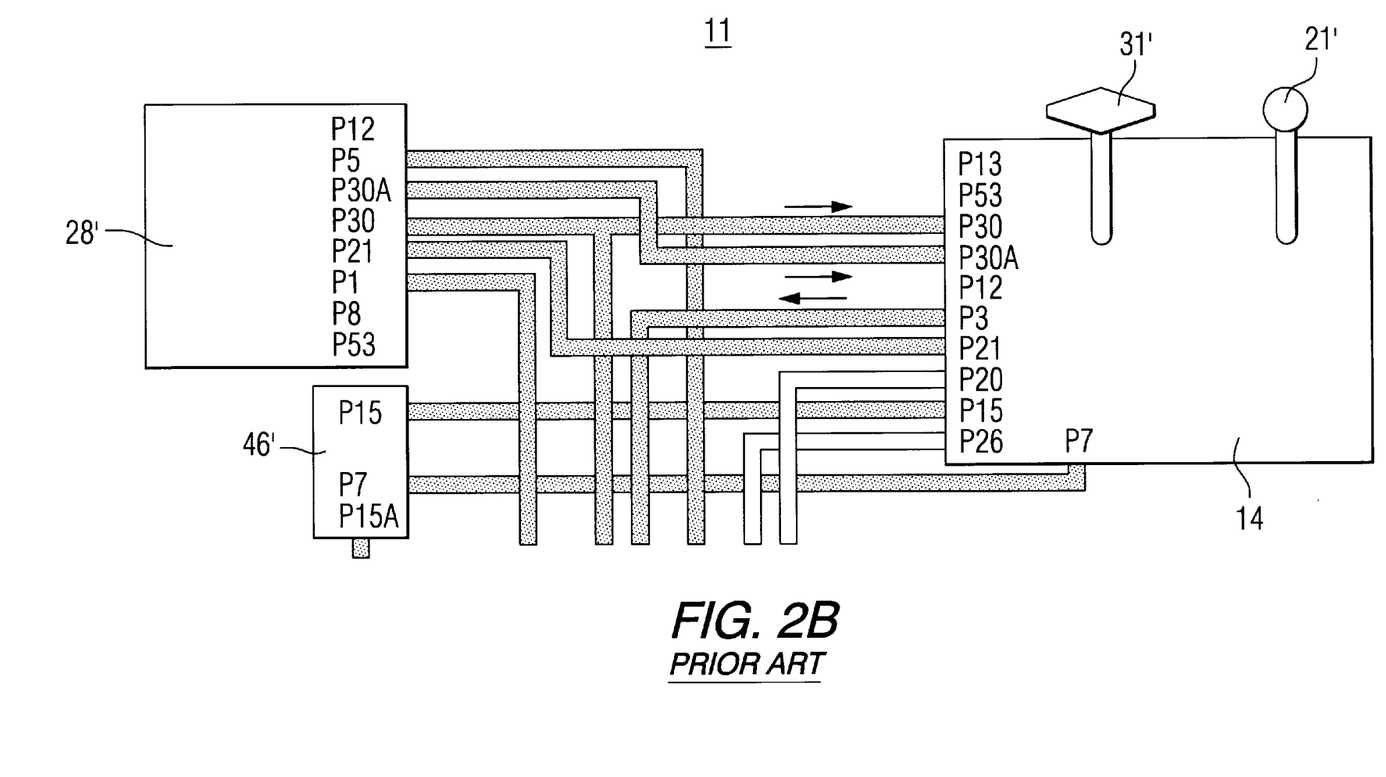
FIG. 2B illustrates an alternative conventional pneumatic automatic brake valve.

Prior to discussing the invention, it may be helpful to provide an overview of the major elements of a train braking system according to one presently preferred embodiment of the invention, shown in FIG. 1. Additionally, the conventional manner of controlling train brakes pneumatically, via a conventional pneumatic automatic brake valve like, for example a WABTEC™ Type 26™ locomotive brake valve 10, will be described in connection with FIG. 2.

FIG. 1 generally illustrates the major components of a train braking system according to the invention, including a locomotive 1 having pneumatic brake equipment represented collectively as reference number 2, which can be connected to a train brake pipe 3. Additionally, each railcar 6 can be provided with ECP brake equipment, represented collectively as reference number 7, which can also be connected to the brake pipe 3, and to a wireline 4. Alternatively, a radio communication system 5, shown in phantom lines, could be utilized as the manner of communicating control signals to the ECP equipped railcars 6 instead of the wireline. An ECP controller 8 can be provided on the locomotive 1 in communication with the pneumatic brake equipment 2 for interfacing the pneumatic brake equipment 2 with the ECP brake equipment 7 on each railcar 6. Generally, the ECP brake equipment 7 on the railcars 6 can operate according to existing practice, and can simply receive control signals from the ECP controller 8 according to the invention, as described hereinafter, for controlling the brake functions on the railcars 6.

According to the invention, the brake control equipment 2 on the locomotive 1 can include both conventional pneumatic equipment, such as an automatic brake valve, and specialized brake control equipment according to the invention. The automatic brake valve can be of a conventional type, such as shown in FIG. 2A or 2B, and similar such automatic brake valves. The specialized brake equipment utilized according to the invention can be as shown in FIGS. 3A through 4B.

Referring to FIG. 2A, a Type 26™ automatic brake valve 10, which is an automatic self-lapping brake valve, is shown arranged with a pipe bracket 16, an can include two main portions: (1) an automatic portion 13, designed for regulating the pressure in the train brake pipe 3, and (2) an independent portion 19 for controlling the braking on the locomotive independently from the train brakes. The automatic portion 13 is mounted on the top of the pipe bracket 16 and the independent portion 19, including the "independent brake" handle 21, is mounted on the front of the pipe bracket 16. All pipe connections are made to the pipe bracket 16. The pipe connections to the pipe bracket 16 are designed numerically, and are so identified in FIG. 2A by the reference numbers having the prefix "P." Note that pipe connection P1 is the port to the brake pipe 3 shown in FIG. 1. The automatic brake valve 10 can also include a cut-off valve portion 22 for the purpose of cutting in and cutting out the automatic brake valve 10, and to permit tests for the measurement of brake pipe 3 leakage. The cut off valve portion 22 can have a switch 23 for selecting between up to three positions, each corresponding to three different modes of operation of the automatic brake valve 10. "freight," "passenger," and "out." The "out" mode is used only when hauling the locomotive "dead" or as a trail unit in multiple unit operation. In the "freight" mode, only direct release of brakes is enabled, whereas in "passenger" mode, incremental increases in equalizing pressure are enabled to permit a graduated release of train brakes. However, this is permissible only in circumstances where both the locomotive 1 and the railcars 6 are equipped to provide a graduated release of the brakes, such as in certain passenger train applications.

The automatic portion 13 of the automatic brake valve 11 is itself comprised of several interrelated components, including a feed valve portion 25, a relay valve portion 28 and an operator control portion, typically the brake handle 31. Other components of the automatic brake valve 10 include a brake pipe cut off valve 34, vent valve 37, emergency vent valve 40, suppression valve 43, and equalizing reservoir cut off valve 46. The exact function and operation of these other components is beyond the scope of this description and would be generally be understood by one of ordinary skill in the art of train braking systems. This information is also not necessary for a full and complete understanding of the present invention.

The feed valve portion 25 is conventionally employed to set the pressure, by turning a screw 49, in an equalizing reservoir on the locomotive, typically during initial train setup. This pressure is commonly referred to as either the "train operating pressure" or the "feed valve setting." The equalizing reservoir pressure is generally maintained at this setting and it is not thereafter adjusted unless the train is brought to a complete stop. Adjustment of the equalizing reservoir pressure can be made when the brake handle 31 is in release position by turning the adjustment screw 49 on the regulating valve 25, but only when the locomotive is not moving.

In FIG. 2B, a different, newer type of automatic brake valve 11 is illustrated. This is generally known as WABTEC™ Type 30-CDW™ automatic brake valve equipment. This newer design brake valve equipment 11 can generally be substituted for the older Type 26™ brake valve 10 shown in FIG. 2A. It includes a first module 14 which has both the brake handle 31' and the independent brake handle 21'. Additionally, a second module can comprise a relay valve portion 28' which operates generally as described previously in regard to the relay valve portion 28 of the automatic brake valve 10. In fact, all of the ports for the automatic brake valve 11 can be the same as for the automatic brake valve 10, and, as such, are also numbered with the prefix "P" in the same manner as in FIG. 2A. Essentially, the automatic brake valve equipment 11 operates in the same way as the automatic brake valve 10. Moreover, as explained previously, there are also other types of similarly functioning automatic brake valves, but such automatic brake valves generally operate in the same basic manner that has been described above with regard to the automatic brake valves 10 and 11.

A simplified diagram of various connections of an automatic brake valve 12 to other components of the brake system 2 according to the invention is shown in FIGS. 3A–4B. The automatic brake valve 12 can generally correspond to such conventional automatic brake valves 10, 11, described above in connection with FIGS. 2A and 2B, as well as other types of similarly operating automatic brake valves. In addition to the previous description with respect to the automatic brake valve 10, and with reference to FIG.

2A, the feed valve portion 25 can also be affected by movement of the brake handle 31, specifically by the cam 55 on the brake handle shaft 58 which adjusts the air pressure in the equalizing reservoir 52 via a charging pipe into port P15. Although not implemented in exactly the same way, movement of the brake handle 31' of the automatic brake valve 11 can cause the same resulting pressure change in the equalizing reservoir 52. This pressure can be externally connected through a device, such as a P2A Brake Application Valve 72, to an equalizing reservoir control pipe into port P5, which leads to the outer diaphragm chamber 61 of the relay valve portion 28. The relay valve portion 28, is a diaphragm operated valve which causes a pressure to be established in the brake pipe 3 that is generally equal to the pressure in the equalizing reservoir 52. Similarly, the relay valve portion 28' of the automatic brake valve 11 can also cause the pressure in the brake pipe 3 to mirror the pressure in the equalizing reservoir 52. As can be seen best in FIG. 2A, equalizing reservoir pressure acts on the outer face 63 of the diaphragm 66 and brake pipe 3 pressure acts on the opposite face 69. The relay valve portion 28 either increases or reduces brake pipe 3 pressure in response to changes in the equalizing reservoir pressure acting on the outer face 63 of the diaphragm 66. During brake applications, the equalizing reservoir pressure on the outer face 63 of the diaphragm 66 is reduced, causing the relay valve 28 portion to exhaust brake pipe 3 air to obtain an equal reduction in brake pipe 3 pressure. When the pressures on each face of the diaphragm are equalized, the self-lapping feature of the relay valve portion 28 generally maintains the brake pipe 3 pressure against overcharges and permissible train leakage. When a release of train brakes is commanded, equalizing reservoir pressure is restored to the pressure set by the feed valve portion 25. This then causes the relay valve portion 28, to pressurize the brake pipe 3 from main reservoir pressure until the pressure on both faces 6?, 69 of the diaphragm 66 equalize again, at which point the relay valve 28 returns to its lapped position.

Typically, on valves such as the automatic brake valve 10, the brake handle 31, or other operator control portion or interface, is used by the train operator to control the brakes on the train by implementing pressure changes in the equalizing reservoir. These pressure changes are then mirrored in the brake pipe 3 by the relay valve portion 28 in order to pneumatically signal the brake equipment on articulated railcars for implementation of braking functions on the railcars. It should be understood that, although described mainly in the context of the components and operation of the automatic brake valve 10, the automatic brake valve 11, and other similar automatic brake valves, generally operate, functionally, in the same manner even though the exact components and manner of control may be different.

In any event, according to the present invention, the manner of initiating a pressure change, which is generally indicative of a brake command, need not be limited to using a "brake handle" and it should be understood that persons of skill in the art could devise other ways to permit the train operator to initiate such pressure changes from an automatic brake valve without using a "brake handle." For example, systems are known which utilize push buttons to activate valves which cause the pressure change. Thus, the use of a brake handle itself is not required to achieve the benefits of the invention, which is instead more generally describes converting a pressure change, initiated via an automatic brake valve, to a signal, for example an electrical signal, which can be communicated to railcars, such as by a wireline or RF communication system, and thus utilized to control braking on the railcars in an ECP manner. Consequently, any operator control portion which interfaces with an automatic brake salve may be used to initiate such a pressure change.

Although described in the particular context of the automatic brake valve 10 shown in FIG. 2A (for convenience), it should be understood that the following description could generally be applicable to the automatic brake valve 11 shown in FIG. 2B. The brake handle 31 is typically movable through a range of "zones" or positions. Generally a there is a "service" zone, which is a range of movement wherein brakes on the train are caused to be applied. There is also a release position wherein the brakes on the train are caused to be released. The level of braking can be gradually increased by advancing the brake handle 31 through the service zone. Conventionally however, especially in the freight mode of operation, any reverse movement of the brake handle 31 back through the service zone will not result in an increase in equalizing reservoir pressure. This is because automatic brake valves such as the Type 26™ are configured such that, with the cut off valve portion 22 positioned in the "out" or "freight" position, movement of the brake handle 31 back toward release position will not cause an increase in equalizing reservoir pressure or brake pipe pressure. In these modes, air pressure in port P7, which is internal to the Type 26™ valve, into the bottom of the equalizing reservoir cut off valve 46 is vented. This prevents pressure in the equalizing reservoir 52 from increasing until the brake handle 31 is placed in release position. Air through port P3 to port P7 under the equalizing reservoir cut off valve 46 lifts the valve off of its seat and allows air to flow. In "passenger" mode, main reservoir air is present on the underside of the equalizing reservoir cut off valve 46, which allows the graduated increases in both the equalizing reservoir 52 and the brake pipe 3. In the "freight" mode, moving the brake handle 31 to release position would result in a full release of the brakes, with each railcar 6 venting the brake cylinders to atmosphere and reducing the brake cylinder pressure to zero.

Advancement of the brake handle 31 from the release position through the service zone causes the feed valve portion 25 to reduce the pressure in pipe connection associated with ports P15 and P5, and thus the equalizing reservoir 52. This reduction in pressure is generally proportional to the amount of brake handle 31 movement, until a total service reduction is obtained at full service position in the service zone. In response to this pressure change in the equalizing reservoir 52, the relay valve 28 adjusts the brake pipe 3 pressure equally as described above. This reduction in brake pipe 3 pressure signals a brake application in the railcars 6, and the level of braking commanded varies according to the position of the brake handle 31 in the service zone.

Figure 3A:
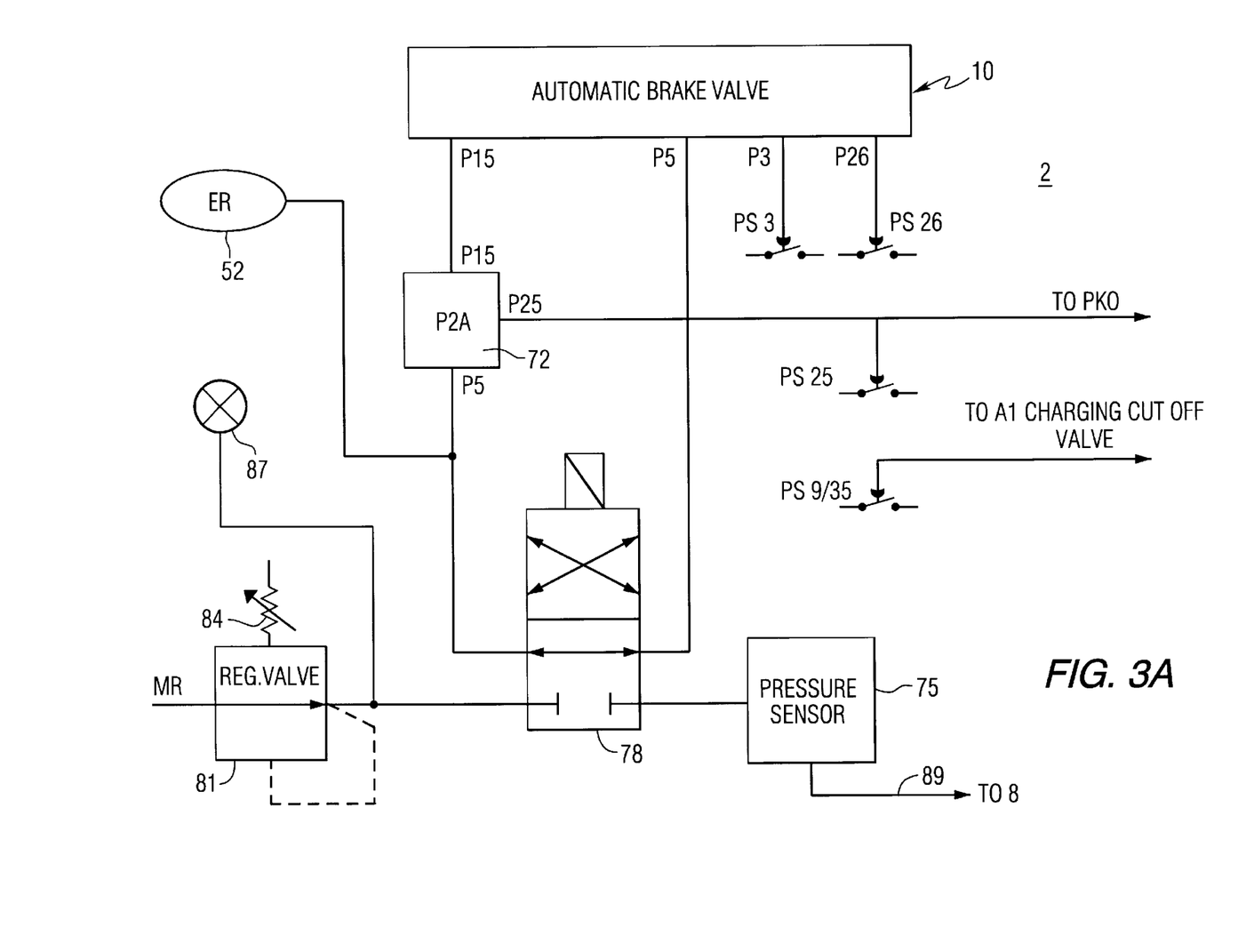
FIG. 3A diagrammatically illustrates an embodiment of the invention with the interface deactivated such that the brake system operates in the conventional manner.
Figure 3B:
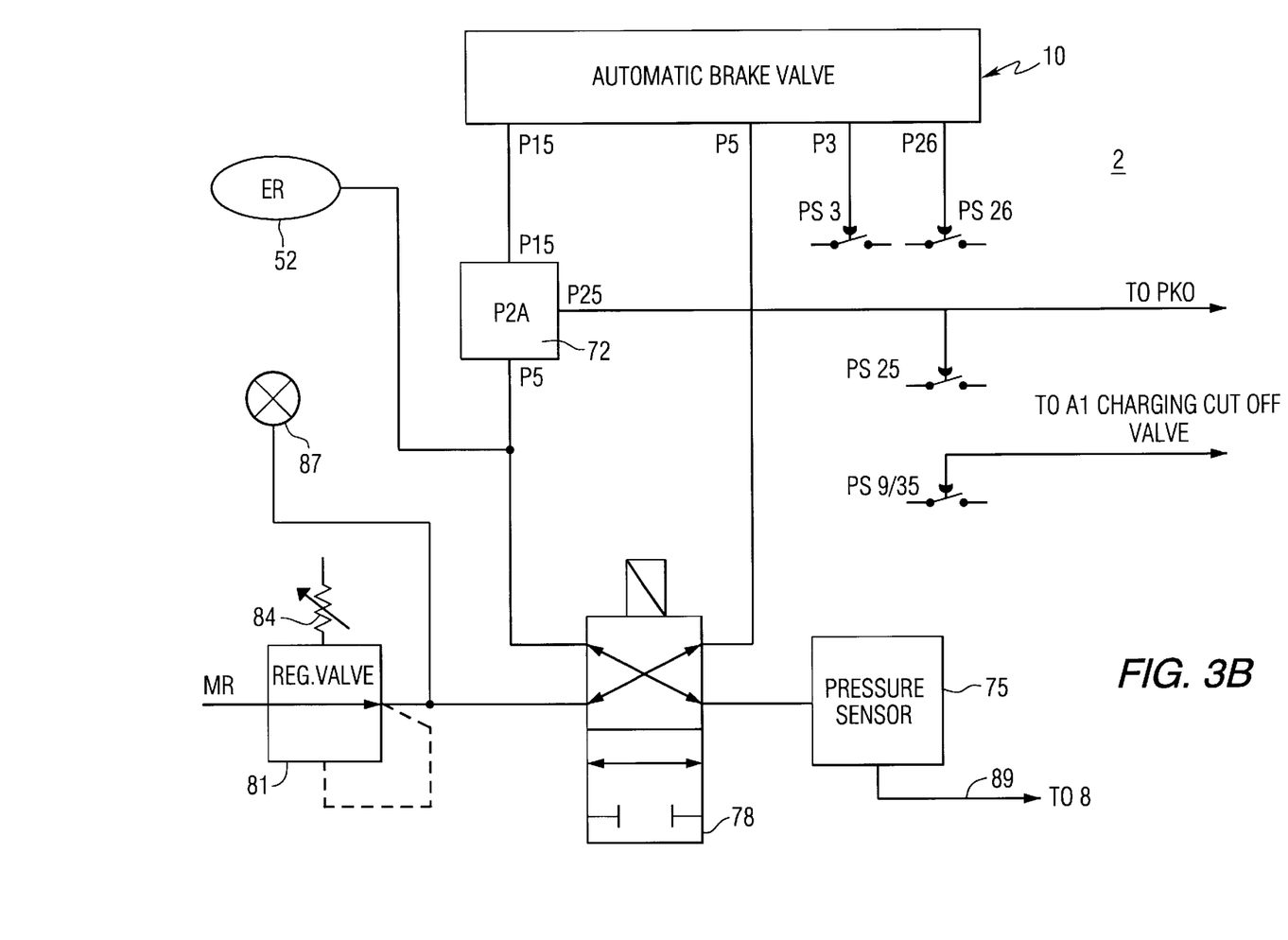
FIG. 3B diagrammatically illustrates an embodiment of the invention with the interface activated such that the brake system operates in accordance with the invention.
Figure 4A:
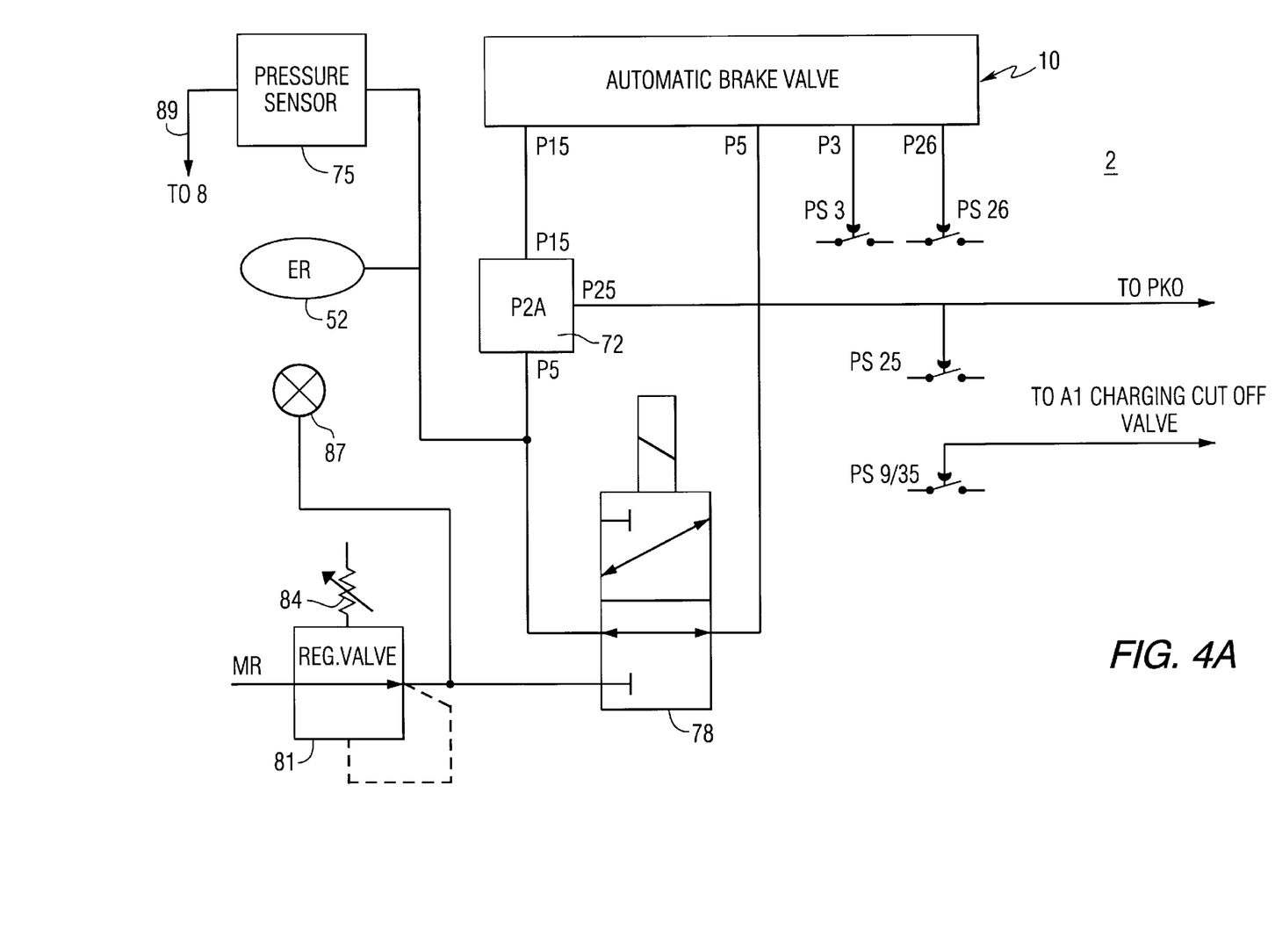
FIG. 4A is a diagrammatic illustration of an alternative embodiment of the invention with the interface deactivated.
Figure 4B:
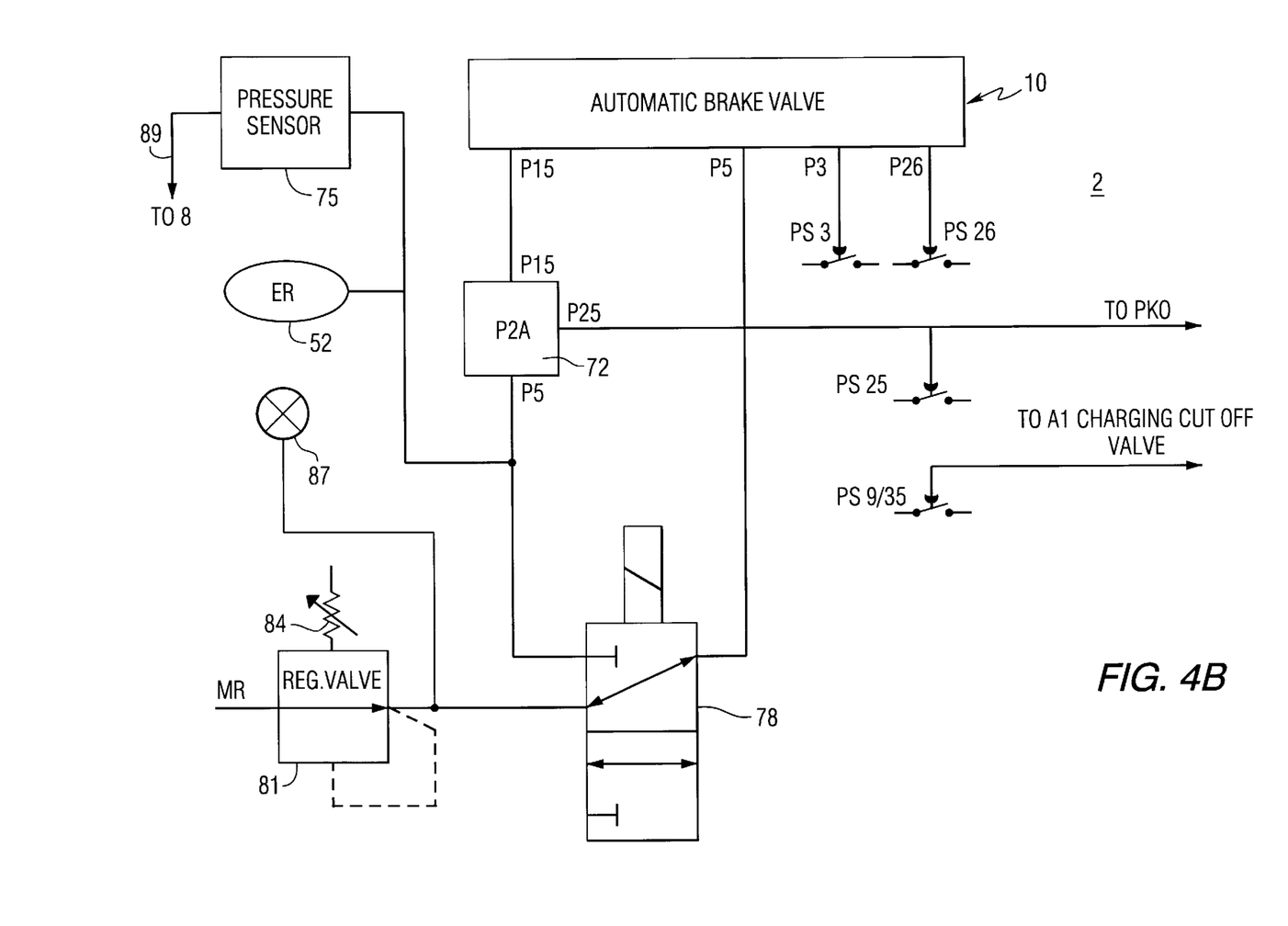
FIG. 4B is a diagrammatic illustration of an alternative embodiment of the invention with the interface activated.

Referring now to FIGS. 3A through 4B, certain embodiments of the present invention will be described in detail hereinafter. FIGS. 3A and 4A illustrate two embodiment of the invention in an inactive state, i.e. wherein the brake valve 10 controls train braking in the conventional manner. FIGS. 3B and 4B, on the other hand, illustrate the same two embodiments of the invention except in the active state, wherein train brakes are controlled according to the invention. The basic difference between the two embodiments of the invention, i.e., the difference between FIGS. 3A–B and 4A–B, is the positioning of a pressure sensor associated with the equalizing reservoir. In other respects, the embodiments operate in a similar manner.

Generally, and as can now be appreciated in view of the prior art operation of the automatic brake valve 10 described above, embodiments of the present invention provide for the use of a conventional locomotive automatic brake valve to control braking on railcars 6 which are equipped with ECP brake systems 7. As a result, the addition of separate ECP brake control equipment to the locomotive cab, such as the HEU described previously, can be unnecessary. Train operators can control the speed of the train using the conventional automatic brake valve 10 to which they have become accustomed over many years of use. Moreover, the familiar brake handle 31 can also be used as the operator brake control interface with the automatic brake valve 10.

As explained previously, the reference pressure, or feed valve setting, for the brake pipe 3 is established by the feed valve portion 25 which regulates the equalizing reservoir 52 pressure to the pressure setting of the feed valve portion 25. As explained above, on one side of the feed valve portion 25 is an adjustable screw 49, while the other side rests on a machined cam 55 on the shaft 58 of the brake handle 31. As the brake handle 31 is moved, various profiles on the cam 55 are moved past the feed valve portion 25, thereby causing pressure to either decrease or increase in the equalizing reservoir 52. However, as explained above, the pressure change in the equalizing reservoir can also be effected by the train operator using some other type of operator control portion of the automatic brake valve 10. This changed equalizing reservoir pressure is then used as pilot pressure in the relay valve 28, i.e., applied to one face of the diaphragm 66, which amplifies the signal to cause large amounts of air to be admitted into the brake pipe 3 from the main reservoir until the pressure in the brake pipe 3 generally equals the pressure in the equalizing reservoir 52.

As described above with regard to the Type 26™ automatic brake valve, graduated brake release is not used in normal freight operation. This is generally because the brake control valves on the railcars, such as ABDW™ valves, are not conditioned to provide incremental reductions in pressure from the brake cylinder. However, the automatic brake valve 10 can be conditioned so that incremental reductions in brake pipe 3 pressure can be made, i.e., incremental increases in braking level can be made by moving the brake handle 31 and applied by the conventional freight car brake valves. The opposite, however, is not true—gradual increases in the brake pipe 3 pressure, so as to gradually reduce pressure in the railcar 6 brake cylinders, generally cannot be done. Conventionally, a brake release can only take place when the brake handle 31 is moved to the release position. This is defined as a direct release mode of operation. In order to provide graduated release for passenger trains, the automatic brake valve can be conditioned, by placing the switch 23 on the cut off valve portion 22 described above in the passenger mode, so that incremental increases in brake pipe 3 pressure can be made. In the passenger mode, movement of the brake handle 31 toward the release position from a position in the service application zone causes the pressure to rise in the equalizing reservoir 52. In response, the relay valve portion 28 causes the brake pipe 3 pressure to follow the rise in equalizing reservoir pressure in the manner described above. However, operation of freight trains with the automatic brake valve 10 configured for graduated release is not recommended, since even a slight move of the brake handle 31 toward the release position can cause the direct release control valves on the railcars 6 to assume a release position.

According to the present invention, use of the graduated release capabilities of the automatic brake valve 10 can be utilized, while causing the brake pipe 3 pressure to remain at some fixed value. As shown in FIGS. 3A through 4B, various pipe and connections from the automatic brake valve 10 are interrupted, or tapped, to provide pressures which can be read by a pressure sensor 75, such as a pressure transducer, and/or pressure switches, which are designated in the drawing figures by the prefix "PS." A regulating valve 81 can be utilized according to the invention to provide a reference pressure for the relay valve portion 28 of the automatic brake valve 10. The supply pressure for the regulating valve 81 can be from a main reservoir on a locomotive of the train and, like the feed valve portion 25 of the automatic brake valve 10, the setting of the regulating valve 81 can be adjusted via adjustment member 84, which can be accomplished via conventional means, such as by controlling a magnet valve, or using a screw as with the feed valve portion 25.

Additionally, an interface unit 78, which can be a simple magnet valve, can be provided to control the passage of air between the equalizing reservoir, via pipes associated with port P15, and the relay valve 28, via pipes associated with port P5. The regulating valve 81, although shown as a separate device, can be part of the interface unit 78.

With the power to the new interface unit 78 turned off, as shown in FIGS. 3A and 4A, the brake system functions conventionally according to the manner described in connection with FIG. 1. Equalizing reservoir pressure, via the feed valve portion 25, is communicated through port P15 to the P2A valve 72, and then back to port PS, into the relay valve portion 28 of the automatic brake valve 10. In this manner, a reduction in equalizing reservoir pressure, caused by movement of the brake handle 31, or other operator control portion, is communicated to the control side, i.e., the outer face 63 of the diaphragm 66, of the relay valve 28, which causes brake pipe pressure to mirror the new equalizing reservoir pressure setting in accordance with the operation of the relay valve 28 described previously.

The P2A valve 72 is commonly used to signal for a full service brake application upon the actuation by certain control features which may be provided in the train braking system, such as overspeed control, train control or safety control. For example, in the event of a penalty condition, the P2A valve 72 would be actuated to block pressure from port P15 from communicating with port P5 of the automatic brake valve 10, and to exhaust pressure from port P5 to atmosphere at a service rate. Air passages in the P2A valve 72 can also connect port P25 to main reservoir pressure, thence, in a penalty application, air flows from the P2A valve 72 through port P25 to a pressure switch PS25, which in turn causes power to be removed from the locomotive's traction motors via a "Power Knock-Out" device, which is normally vented to atmosphere.

When energized, as shown in FIGS. 3B and 4B, the interface unit 78 is conditioned to interrupt the flow of air from port P5 of the P2A valve 72 to port P5 of the automatic brake valve 10. Instead, port P5 of the P2A valve 72 is connected to the pressure sensor 75, which can generate an output signal 89 representative of the pressure being sensed. Likewise, port P5 of the automatic brake valve 10 is redirected by the interface unit 78 to the regulating valve 81. A pressure gauge 87 can be provided to indicate, and display, the pressure at the regulating valve 81, which can be adjusted to the desired value via the adjustment switch 84. As can be seen due to the different positioning of the pressure sensor 75 in FIGS. 3B and 4B, the pressure sensor 75 can be connected to the equalizing reservoir 52 through interface unit 78 such that pressure in the equalizing reservoir 52 is sensed only when the interface unit 78 is activated, i.e. FIG. 3B, or can be connected directly to the equalizing reservoir 52 such that pressure therein can be sensed whether or not the interface unit 78 is activated.

The regulating valve 81 can be set at the typical feed valve 25 setting of 90 psig. This pressure will communicate through the interface unit 78 to port P5 of the automatic brake valve 10. The connection of port P5 to the reference pressure established by regulating valve 81 can ensure that a constant, regulated pressure will be generally maintained on the control side of the relay valve portion 28.

With the interface unit 78 in the energized state, the automatic brake valve 10 is conditioned for graduated release mode. In this mode, the pressure delivered from port P15 of the automatic brake valve 10 will change up or down in response to the movement of the brake handle 31 through its operating range. The pressure changes resulting from movement of the brake handle 31, or other operator control portion, are directed to the pressure sensor 75, which can produce an output signal 89 representative of the pressure being sensed. The output signal 89 from the pressure sensor 75 can be communicated to the ECP controller 8 by a train wireline 4, radio communication 5, or the like. However, use of RF communications would require an RF transceiver on the locomotive 1 to send the signal to the ECP equipped railcars 6 and an RF transceiver in the ECP equipment 7 to receive the signal. The ECP controller 8 would likely be located on the locomotive 1, as shown in FIG. 1, and can include a processor. The ECP controller 8 can utilize the output signal 89 from pressure sensor 75, which can be indicative of the expected level of braking effort commanded by movement of the brake handle 31, or any other brake control valve interface, to determine the level of braking to be applied on the ECP equipped railcars 6. The ECP controller 8 can then generate signals used to control the ECP equipment 7 via the wireline 4, or RF communications 5. For example, a range could be created, wherein placing the brake handle 31 in minimum service position would represent a 10% brake effort. Moving then to full service position would cause 100% of the braking effort, and the level of braking effort corresponding to positions in between would be determined proportionally, between 10% and 100%, according to the number of degrees (the brake handle moves generally in an arc) the brake handle 31 is moved. Alternatively, similar methods could be devised using other types of operator control portions, besides the brake handle 31, to create a similar range of valves which could be used to proportion the amount of braking desired, and which could be thus converted to a signal for use in controlling the braking on the railcars in an ECP manner.

As can be seen in FIGS. 3A–4B, the brake pipe 3 is not connected to regulating valve 81, or to the feed valve portion 25 of the automatic brake valve 10. Consequently, when the interface unit 78 is energized, the brake pipe 3 is used only as a supply line. In this condition, the brake pipe 3 is charged and vented by relay valve 28, which derives its control signal pressure from the regulating valve 81. Thus, the brake pipe 3 is generally isolated from pressure changes which would otherwise affect the operation of the train brakes. Likewise, the brake handle 31 can be moved incrementally back toward release position, and a corresponding reduction in braking effort will take place without any effect on brake pipe pressure.

One scenario for changing over train braking system from conventional pneumatic operation to ECP operation could be to configure the system such that the brake handle 31, or other operator control portion, must be in release position prior to enabling the interface unit 78. Next, the brake handle 31, or other operator control portion, would be moved to the suppression position, where a reading of the maximum pressure reduction is made. Finally, the brake handle 31, or other brake control valve interface, can be moved to the release position and the interface unit 78 can be energized. The state change in the interface unit 78 would turn response of the automatic brake valve 10 over to the ECP braking system.

In addition to the basic operation of the system described above, various other pressures can be read by pressure switches, indicated by the prefix "PS," to permit the interface unit 78 and ECP system 7 to derive certain information from the pneumatic brake equipment which can be used to perform specific functions. For example, port P3 of the automatic brake valve 10 is typically pressurized only when the brake handle 31, or other operator control portion, is in the release position. By monitoring the status of port P3 through the interface unit 78, the ECP system 7 could establish the normal, zero percent braking baseline. In similar fashion, port P26 is typically pressurized only when the brake handle 31 is in suppression positions, or beyond. This signal could be used to determine the maximum braking effort, since the reduction in brake pipe pressure is the same in suppression as is in the full service position. The scenario for changing to ECP mode could be set up so that the brake handle 31, or other operator control portion, must be in release position to energize the ECP interface unit 78. The brake handle 31, or other operator control portion, could then be moved to the suppression position, where a reading of the greatest reduction is made. At that point, the brake handle 31, or other operator control portion, can be moved to the release position to energize the interface unit 78. The state change in the interface unit 78 would turn response of the automatic brake valve 10 over to the ECP system 7.

Other pressures monitored could include port P25 of the P2A valve 72, and ports P9 and P35 of an A1 charging cut-off valve, another valve commonly used in this type of braking system. Inputs to the various pressure switches would take place during events such as penalties or emergencies. Under software control, the ECP system 7 could then make decisions regarding the control of the train brakes.

The invention thus allows a train operator to control braking on ECP equipped railcars 6 using the familiar pneumatic brake handle 31, or other operator control portion, on a conventional automatic brake valve 10 with which the train is conventionally controlled. Consequently, the amount of training required on new equipment can be lessened, and the placement of additional hardware in the cab of the locomotive can be avoided.

Although certain embodiments of the invention have been described in detail, it will be appreciated by those skilled in the art that various modifications to those details could be developed in light of the overall teaching of the disclosure. In particular, it is to be understood that the invention is not limited to application with only the Type 26™ automatic brake valve or using a "brake handle, but can be utilized in accordance with the teachings herein with any similarly functioning automatic brake valve, or operator control portion, which controls the tram brakes via conventional automatic brake valve and usual pneumatic connections with, for example, a brake pipe, equalizing reservoir, relay valve, feed valve, main reservoir, and the like. Moreover, since the railroads, and also federal regulations concerning train operation, cover most aspects of train brake control systems, most, if not all, automatic brake control valves typically operate in generally the same manner and provide generally the same functions.

Accordingly, the particular embodiments disclosed herein are intended to be illustrative only and not limiting to the scope of the invention which should be awarded the full breadth of the following claims and any and all embodiments thereof.

What is claimed is:

1. An apparatus for controlling electro-pneumatic braking on a train of ECP equipped railcars using a pneumatic brake valve located in a cab of a locomotive of the train, said locomotive and ECP equipped railcars interconnected by a brake pipe and a brake control signaling system, said apparatus comprising:
   a. an operator control portion connected to said brake valve and operable to cause a pressure change representative of a pneumatic brake command;
   b. a relay valve in communication with at least said brake valve and said brake pipe, said relay valve conventionally causing pressure in said brake pipe to mirror said pressure change;
   c. an interface unit in communication with at least said relay valve, said interface unit controllable to isolate said relay valve from said pressure change such that said relay valve does not mirror said pressure change in said brake pipe;
   d. a pressure sensor communicating with said brake valve at least when said interface unit isolates said relay valve, said pressure sensor producing a signal corresponding to said pressure change; and
   e. an ECP controller receiving said signal and controlling braking on said railcars based upon said pressure change via said brake control signaling system.

2. The apparatus of claim 1 wherein said operator control portion further comprises a brake handle.

3. The apparatus of claim 1 wherein said brake control signaling system further comprises at least one of a wireline and a radio communication system.

4. The apparatus of claim 1 further comprising said interface unit controllable to connect said relay valve to a reference pressure source such that pressure in said brake pipe is generally maintained at said reference pressure.

5. The apparatus of claim 1 further comprising:
   a. an equalizing reservoir in communication with said brake valve, said relay valve, and said pressure sensor, said pressure change caused in said equalizing reservoir by said brake valve; and
   b. said interface unit interposed between said equalizing reservoir and said relay valve for isolating said relay valve from said pressure change caused in said equalizing reservoir.

* * * * *